United States Patent [19]

Kogawa et al.

[11] Patent Number: 4,601,009
[45] Date of Patent: Jul. 15, 1986

[54] MEMORY SYSTEM AND ACCESSING METHOD

[75] Inventors: Takashi Kogawa, Sakura; Kazuyoshi Teramoto; Takeshi Hashimoto, both of Funabashi, all of Japan

[73] Assignees: Hitachi, Ltd.; Hitachi Keiyo Engineering Co., Ltd., both of Tokyo, Japan

[21] Appl. No.: 530,470

[22] Filed: Sep. 8, 1983

[30] Foreign Application Priority Data

Sep. 16, 1982 [JP] Japan .................. 57-159491

[51] Int. Cl.⁴ ............................. G06F 12/06
[52] U.S. Cl. ................................ 364/900
[58] Field of Search ............... 365/1, 4, 5, 235, 236; 364/192, 200 MS File, 900 MS File

[56] References Cited

U.S. PATENT DOCUMENTS

| | | | |
|---|---|---|---|
| 4,126,894 | 11/1978 | Cronshaw | 364/200 |
| 4,128,891 | 12/1978 | Lin | 365/1 X |
| 4,130,873 | 12/1978 | Fioretta | 364/192 X |
| 4,221,003 | 9/1980 | Chang | 364/900 |
| 4,368,513 | 1/1983 | Meltzer | 364/200 |
| 4,393,500 | 7/1983 | Imazeki | 365/1 X |
| 4,419,740 | 12/1983 | Hevenor | 364/900 |
| 4,447,887 | 5/1984 | Imazeki | 365/1 X |

Primary Examiner—Harvey E. Springborn
Assistant Examiner—Florin Munteanu-Ramnic
Attorney, Agent, or Firm—Antonelli, Terry & Wands

[57] ABSTRACT

A memory system has a first memory such as a magnetic bubble memory and a second memory such as a RAM having a faster access time than the first memory. The first memory is divided into a plurality of blocks each of which has program steps stored therein. The second memory has a plurality of unit chains which correspond to the blocks of the first memory respectively and in each of which step information representative of the number of steps stored in the corresponding block and pointer information indicative of a connection to a next block are stored. The step information in the unit chains are successively read in accordance with predetermined start block information and the pointer information to count the total number of steps on the basis of the read step information. From the first memory is read information in the block corresponding to the unit chain of the second memory with respect to which the counting is made when the counted number of steps reaches or exceeds a program step number to be detected.

8 Claims, 5 Drawing Figures

MEMORY SYSTEM AND ACCESSING METHOD

BACKGROUND OF THE INVENTION

The present invention relates to a memory system which uses slow access time memory elements as a main memory as represented by a magnetic bubble memory, and a method for access in such a memory system.

The magnetic bubble memory is of large capacity and the low cost and memory contents thereof are not destroyed when the power is shut off. Thus, the use of the magnetic bubble memory as a main memory for controlling an office machine or an industrial machine has been discussed. However, in spite of the advantages described above, the magnetic bubble memory has not been used as expected. The biggest cause therefor is that the access time of the magnetic bubble memory is several tens of milliseconds which is very slow in comparison with the access time of a core memory or a semiconductor memory, which is 100 microseconds.

Accordingly, the magnetic bubble memory is not suitable for use with a high performance robot or a high performance machine tool which requires access to the main memory at a high frequency, and the application of the large capacity memory is limited when it is not applicable to the high performance robot or the high performance machine tool.

SUMMARY OF THE INVENTION

It is an object of the present invention to provide a memory system and a method for access in the memory system in which a block of a desired data in a main memory which uses slow access time memory elements as represented by the magnetic bubble memory, can be rapidly located.

It is another object of the present invention to provide a memory system and a method for access in the memory system in which specified data can be rapidly read out from a main memory.

It is a further object of the present invention to provide a memory system which can readily edit data in a main memory.

The other objects and advantages of the present invention will be apparent from the following description of the invention.

In the present invention, a first memory used as a main memory for storing a program is provided in the form of a magnetic bubble memory which has a slow access time on the one hand, but has a certain characteristic feature, such as a low cost, a large memory capacity or a non-destructive storage of memory contents a power failure on the other hand.

The memory area of the first memory is divided into a plurality of blocks. Each of the blocks is sub-divided into a plurality of sub-blocks as required. Each block is called a page. One block may consist of one page. It is preferable that each of the blocks consists of the same number of pages and the number of bytes in each page is the same. Each block is assigned with its own address.

A second memory means is provided which is constructed by memory elements having a faster access time than those of the first memory. Preferably, a random access memory (RAM) as represented by a semiconductor memory, or a core memory which has a fast access time and is writable, is used as the second memory. The second memory is provided with unit chains, one for each block. Each unit chain includes a step information field which represents the number of steps written in the corresponding block, a pointer information field which indicates a connection to the next block, and an address field which indicates an address corresponding to the block address. If the numbers of steps written into the respective blocks are equal, the step information field may be omitted.

Since the second memory may essentially comprise a plurality of unit chains, one for each of the blocks, the memory capacity of the second memory is much smaller than that of the first memory. Accordingly, the cost is not significantly increased by the provision of the second memory.

A designation unit which produces a signal representing a step number to be read is provided. The step designation unit is manually operated in an operation instruction mode, and automatically operated in accordance with previous instructions in an automatic mode.

When the blocks have the same number of steps, the designation may produce a signal which indicates a sequence of the blocks to be read in accordance with the content of a pointer. In this case, the designation unit functions as a means for block designation.

A counter means for counting the number of steps counted in accordance with the pointer information stored in the pointer information field is provided. When the step designation unit produces the signal which represents the sequence of the blocks to be read in accordance with the content of the pointer, the counter counts the number of blocks read in accordance with the content of the pointer.

A status detection unit for detecting a specific status as represented by a coincidence of the outputs of the step designation unit and the counter is provided. The status detection unit may be a comparator or an up/-down counter. When the up/down counter is used, the outputs of the step designation unit and the counter may be converted to pulse sequences as required and one of them may be applied to a count-up input terminal while the other may be applied to a count-down input terminal.

A read unit for reading the information stored in the block when the output received from the status detection unit indicates the specific status is provided. The read unit is usually operated in the automatic mode but it is preferably operated in the instruction mode because it may be required to read out the memory content of the block during the instruction mode.

Updating unit for updating the pointer information stored in the unit chain when the output received from the status detection means indicates the specific state is provided as required. The updating unit is preferably operated in the instruction mode.

BRIEF DESCRIPTION OF THE DRAWINGS

The present invention will be apparent from the following detailed description taken in conjunction with the accompanying drawings, in which.

DESCRIPTION OF THE PREFERRED EMBODIMENTS

Figure 1:
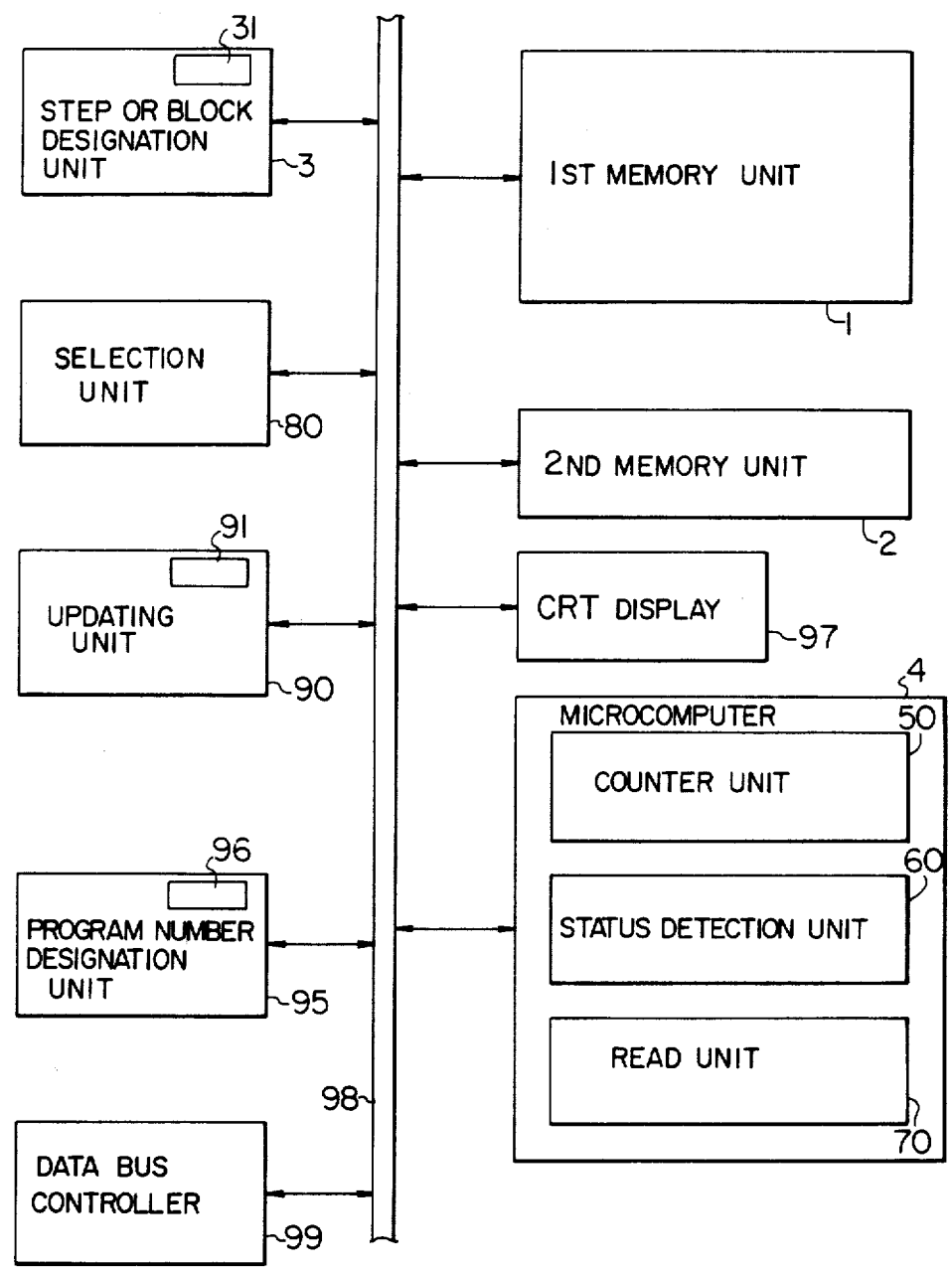
FIG. 1 is a block diagram of one embodiment of a memory system of the present invention.

Referring to FIG. 1, numeral 1 denotes a first memory unit which is constructed by magnetic bubble memory elements. As diagramatically shown in FIG. 2, the first memory unit is divided into a plurality of pages 100, 101, ... 1nm, which are grouped into blocks 10, 11, ... 1n each having m pages. Each of the blocks is assigned with its own address a10-a1n, and each of the pages is assigned with address ad0-adm at an address field in order to discriminate the pages within the block. Each page comprises at least one byte. Numeral 2 denotes a second memory unit which is constructed by a semiconductor memory called an LSI or IC memory. As diagramatically shown in FIG. 2, the second memory unit includes unit chains 20, 21, ... 2n which correspond to the blocks 10, 11, ... 1n of the first memory unit 1, respectively, and each of the unit chains has an address field a20, a21, ... a2n which stores the block address in the first memory unit corresponding to the unit chain, a step information field S20, S21, ... S2n which stores information representing the number of steps stored in the corresponding block, and a pointer information field P20, P21, ... P2n which indicates the adjacent one of the blocks 10, 11, ... 1n.

Numeral 3 denotes a step designation unit which produces a signal representing the step number to be located. In an operation instruction mode to an automatic machine, not shown, controlled by the memory system, the step designation unit 3 produces a signal by the actuation of digital switches 31, and in an automatic operation mode, it automatically produces the signal in accordance with the instruction information.

Numeral 4 denotes a microcomputer which has the three functions of a counter unit 50, status detection unit 60 and read unit 70. The counter unit 50 counts the number of steps counted in accordance with the pointer information stored in the pointer information field P20, P21, ... P2n shown in FIG. 2. The status detection unit 60 produces a signal when the output of the counter unit 50 is larger than or equal to the output of the status detection unit 60. The address of the corresponding block stored in the address field a20-a2n of the unit chain is displayed on a CRT display 97. The read unit 70 reads the information from the block 10, 11, ... 1n which stores the corresponding step when the status detection unit 60 produces the signal and a signal from a selection unit 80 designates an access mode.

The selection unit 80 usually designates the access mode in the automatic operation mode, and designates the access mode as required in the instruction mode.

Numeral 90 denotes an updating unit which receives the output from the status detection unit 60 and updates the pointer information stored in the corresponding unit chain by actuating digital switches 91 when the output of the status detection unit 60 indicates the specific status.

Numeral 95 denotes a program number designation unit which produces a signal by the actuation of digital switches 96 in the instruction mode and automatically produces a signal in accordance with the instruction information in the automatic mode. Numeral 97 denotes the CRT display for displaying the information.

Signal flows among the first memory unit 1, the second memory unit 2, the step designation unit 3, the microcomputer 4, the selection unit 80, the updating unit 90 and the CRT display 97 are controlled by a data bus controller 99 connected to a system bus 98.

Figure 3:
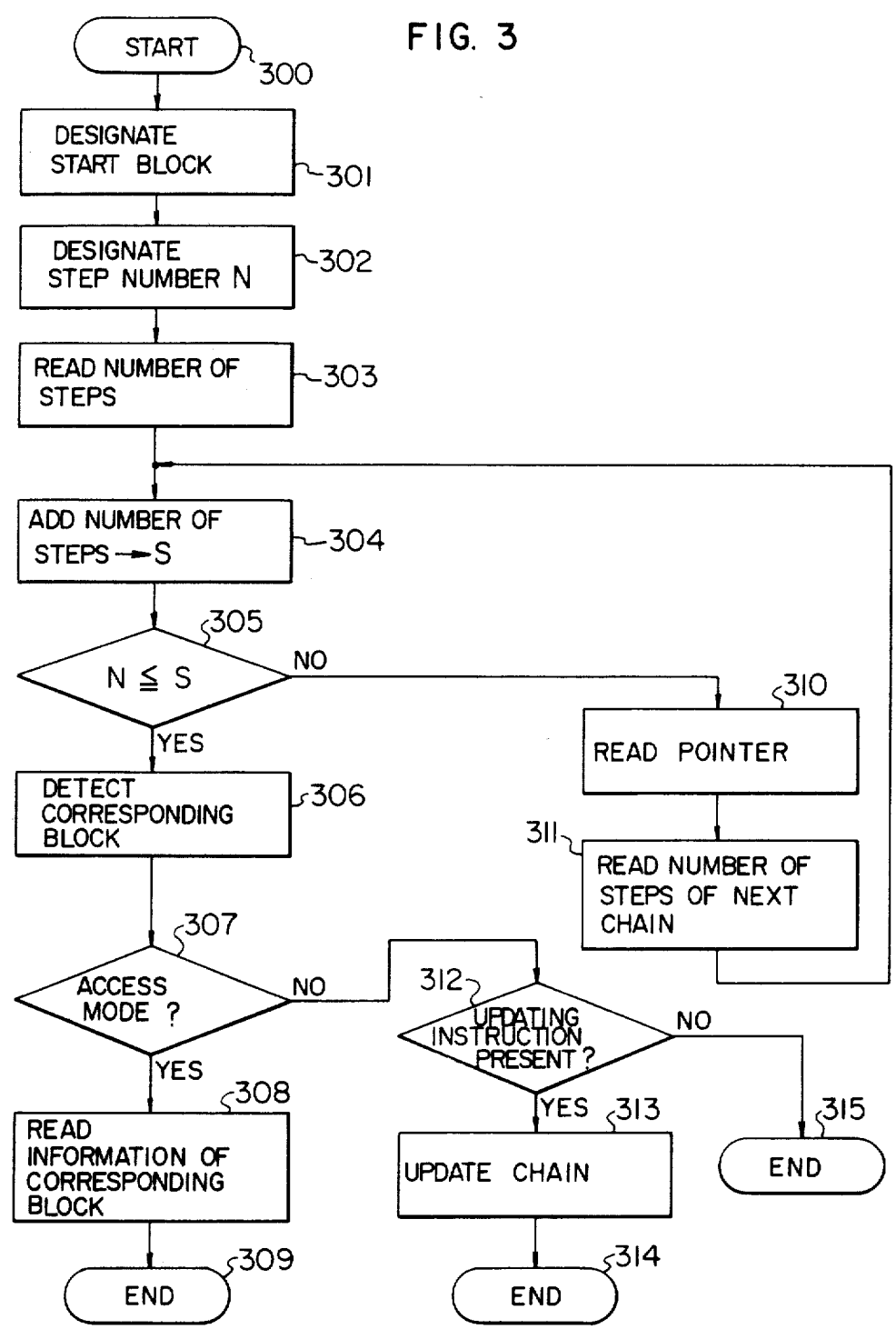
FIGS. 3 and 5 are flow charts showing an access method and an update method for the memory system of the present invention.

The operation of the above configuration is now explained with reference to FIG. 3.

A step 300 is a start step. In a step 301, a program number is designated by actuating the digital switches 96 by the program number designation unit 95, or automatically. For a start block of the program, that is, in the case of FIG. 2, the block 10 or 13 is designated. One of them is selected depending on the purpose intended. Let us assume that the block 13 is selected.

In a step 302, the digital switches 31 are actuated by the step designation unit 3 to set a step number N.

In a step 303, the number of steps St23 stored in the block 13 is read from the step information field S23 in the second memory unit 2.

In a step 304, since the number of steps so far counted by the counter unit 50 is zero, a sum of zero and the number of steps St23, that is, S=St23 is outputted.

In a step 305, the output of the counter unit 50 is compared with the step number N designated in the step 302, by the status detection unit 60. If N≦S, the process goes to a next step 306, and if N>S, it goes to a step 310.

If the process goes to the step 306, it indicates that the step number designated in the step 302 is included in the block 13. Accordingly, in the step 306, the address a13 which indicates the block 13 stored at the address field a23 of the unit chain is displayed on the CRT display 97.

In a step 307, it is checked if the selection unit designates the access mode. If it does, the process goes to a step 308, and if it does not, the process goes to a step 312.

In the step 308, the read unit 70 reads the whole content stored in the block 13 which has the address a13 and displays it on the CRT display 97.

A step 309 is an end step.

If the decision in the step 305 indicates N>S, it indicates that the program step N is not included in the block 13. Thus, the process goes to a step 310, where the pointer P23 in the unit chain is read. The pointer thus indicates that the unit chain 23 is followed by the unit chain 24 as shown by the chain f34.

In a step 311, the number of steps stored in the step information field S24 in the chain 24 is read. Then, the process goes to the step 304 where it is checked if N≦St23+St24. If the decision is YES, the process goes to the step 306, and if NO the steps 310, 311, 304 and 305 are repeated until the decision of YES is obtained.

If the decision in the step 307 is NO, the process goes to the step 312 where the presence or absence of the updating instruction from the updating unit 90 is checked. If the updating instruction is absent, the process goes to a step 315 to terminate the process. Such a situation occurs when the information stored in the program step N is known but the location of the program step is not known.

If the updating instruction is present, the process goes to a step 313 where the chain is updated by the digital switches 91 in the updating unit 90.

Figure 2:
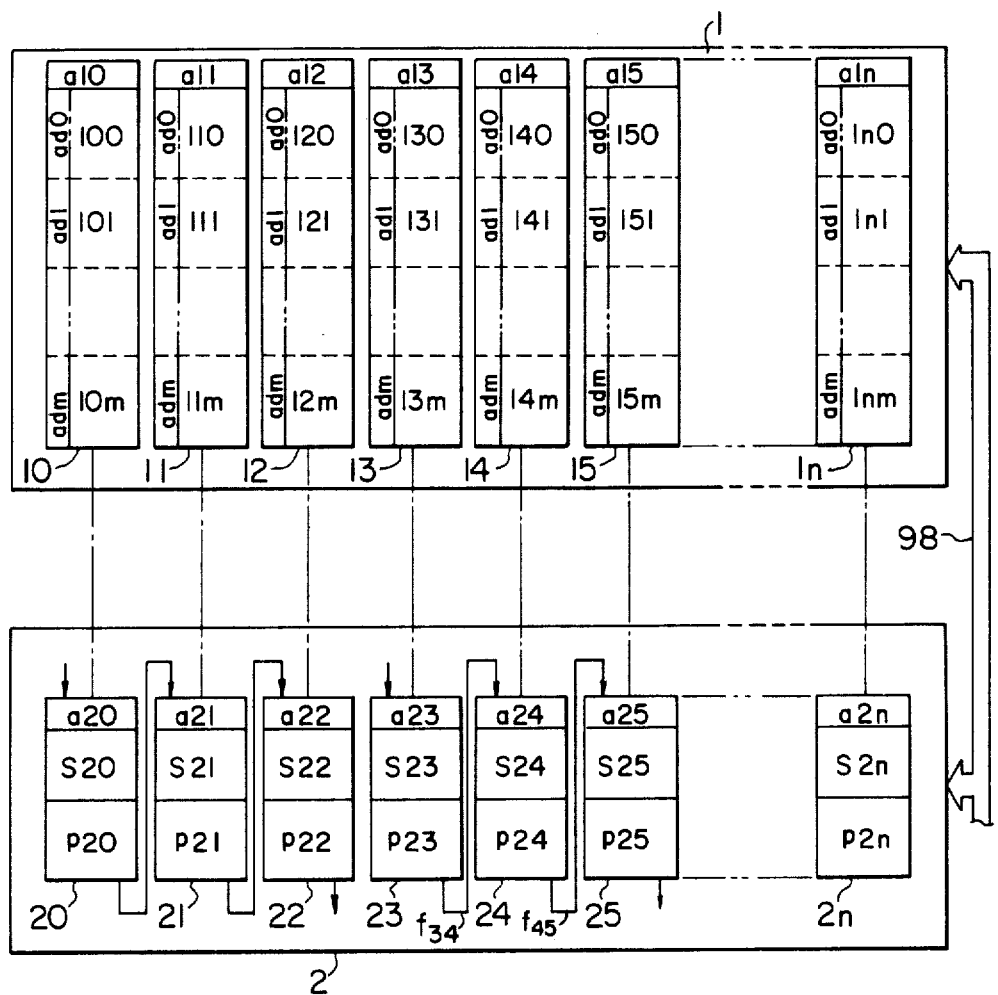
FIGS. 2 and 4 show information stored in first memory unit and second memory unit.
Figure 4:
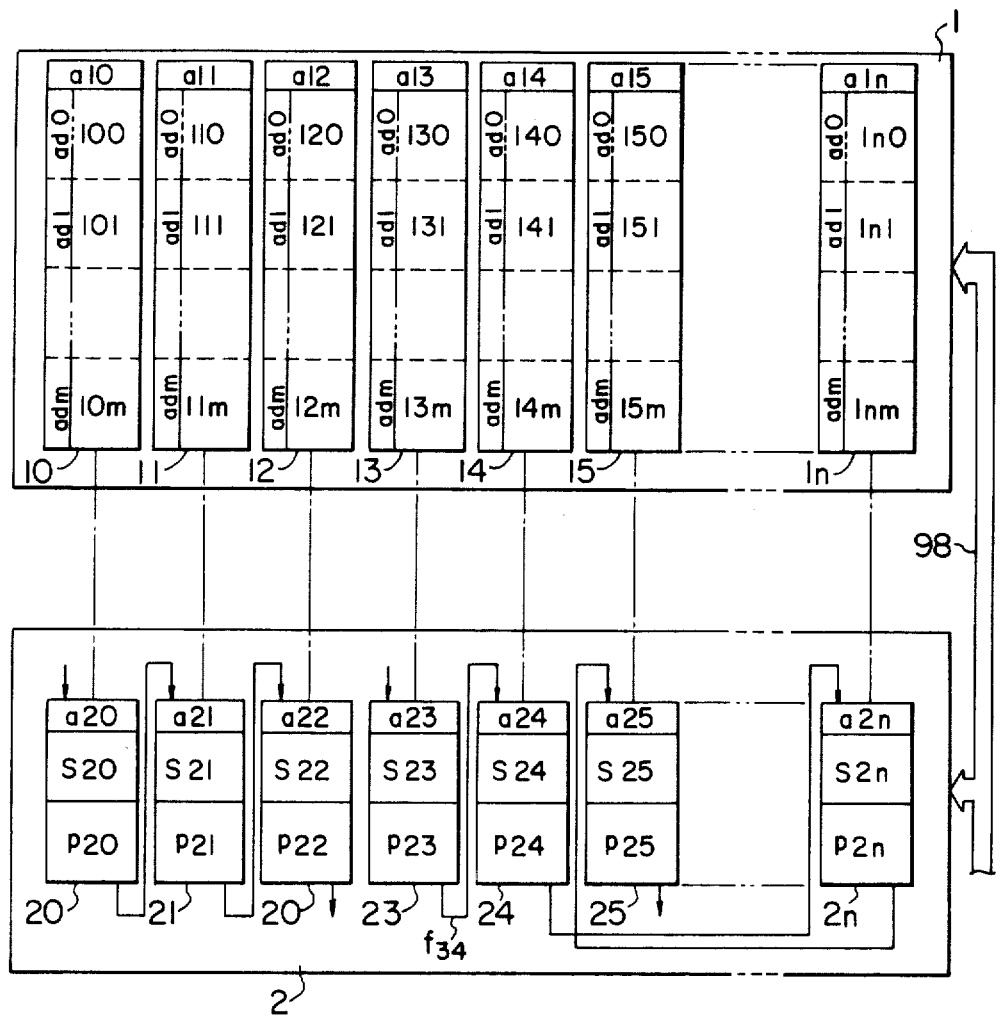

FIG. 4 shows an example of such a case. In FIG. 4, the chain f45 shown in FIG. 2 is divided and the block 1n is inserted between the blocks 14 and 15. The information stored in the pointer information field P24 is updated by the digital switches 91 so that the chain is connected to the unit chain 2n. On the other hand, the information indicating the connection to the unit chain 25 is stored in the pointer information field P2n. Necessary information is also written in a teaching box (not shown) of the block 1n corresponding to the unit chain 2n.

Figure 5:
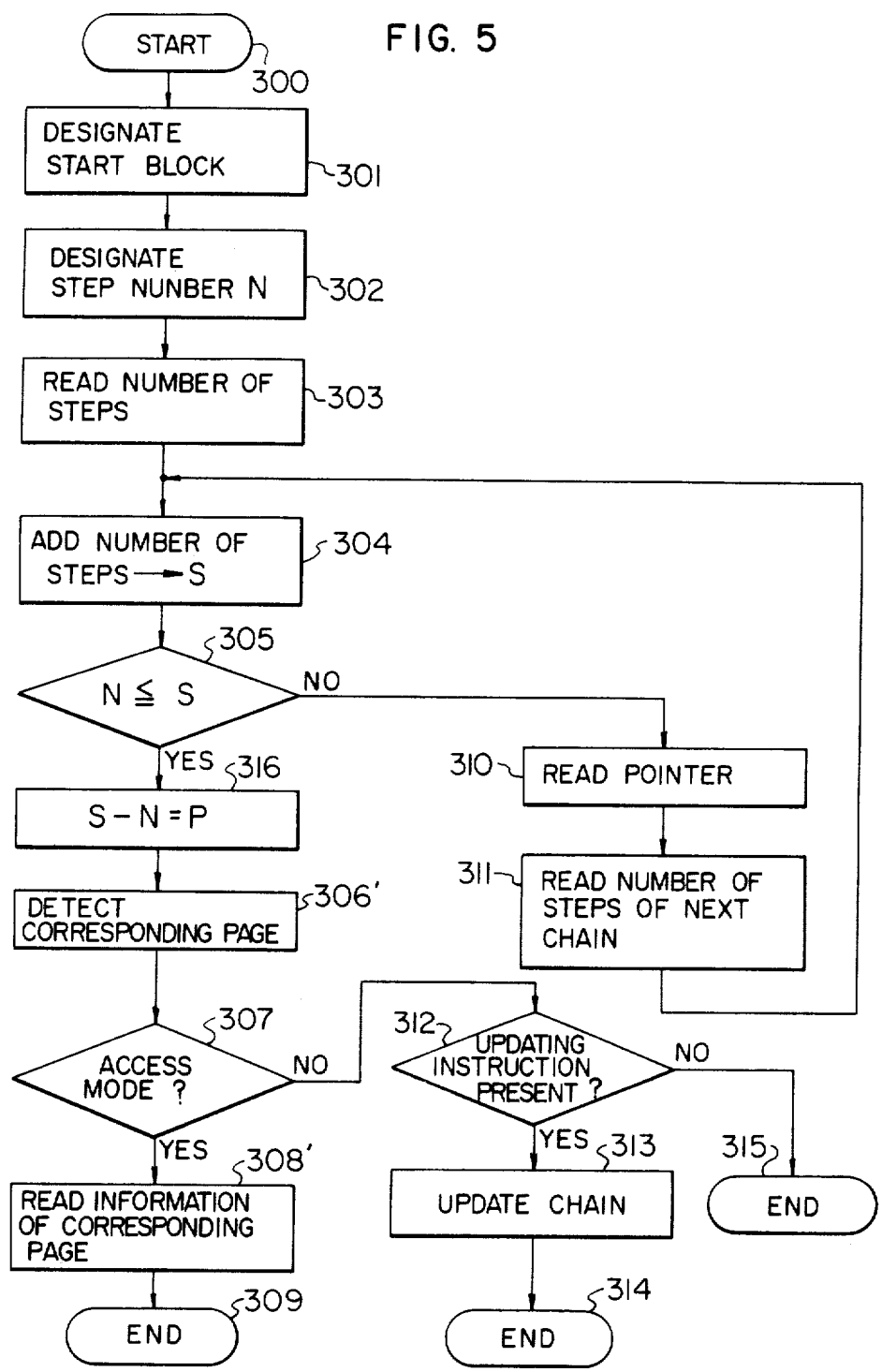

When each of the pages contains one program step at maximum and vacant areas of the program steps are concentrated only in the end page of the block, the page-by-page reading can be attained. In this case, the counter unit 50 shown in FIG. 1 carries out the operation S−N=P shown in the step 316 shown in FIG. 5 when the condition of N≦S is met. For example, if the condition of N≦S is met when the content of the step information field S24 in FIG. 2 is read and P is equal to 2, it is determined that the page 141 includes the information of the step N. Accordingly, the corresponding page can be directly accessed as shown by steps 306' and 308' and the information in the corresponding page can be read.

When the numbers of steps written into respective blocks of the first memory unit 1 are equal, it is not required that each unit chain of a second memory unit 2 has a step information field. In such case, the designation unit 3 may be provided as a block designation unit in place of the step designation unit previously described with reference to FIG. 1. The counter unit 50 counts the number of blocks initially with respect to a first one of the unit chains 20-2n of the second memory unit 2 corresponding to a start block designated by the program number designation unit 95, and then with respect to a unit chain corresponding to the next block indicated by pointed information stored in a pointer information field of the first unit chain. The status detection unit 60 detects a specific status between outputs of the block designation unit 3 and the counter unit 50 by comparing the output of the counter unit 50 with the block number designated by the block designation unit 3.

We claim:

1. A memory system comprising:
    first memory means having a plurality of blocks and address fields one for each of said blocks;
    second memory means having a faster access time than said first memory means and having unit chains one for each of said blocks, each of said unit chains having a step information field for storing step information representing the number of steps stored in the corresponding block, a pointer information field for storing pointer information indicating a connection to a next block, and an address storing field for storing an address corresponding to the address field of the corresponding block of said first memory means;
    step designation means for producting a signal representing a step whose memory location is to be detected;
    counter means for counting the number of steps stored in said step information field; and
    status detection means connected to received output signals of said step designation means and said counter means for detecting a specific status therebetween, the counting by said counter means being carried out initially with respect to the unit chain corresponding to a predetermined start block and if said specific status is not detected after counting the number of steps in said start block, then the counting being carried out with respect to the unit chain corresponding to the next blocks successively indicated by the pointed information until said status detection means detects said specific status, the detection of said specific status by said status detection means indicating that said step to be detected is stored in that block of said first memory means corresponding to the unit chain with respect to which the counting by said counter means is carried out upon detection of said specific status by said status detection means.

2. A memory system according to claim 1, wherein said first memory means is a magnetic bubble memory.

3. A memory system according to claim 2, wherein said second memory means is a random access memory.

4. A memory system according to claim 1, wherein each of said blocks comprises at least one page.

5. A memory system comprising:
    first memory means having a plurality of blocks and address fields one for each of said blocks;
    second memory means having a faster access time than said first memory means and having unit chains one for each of said blocks, each of said unit chains having a step information field for storing step information representing the number of steps stored in the corresponding block, a pointer information field for storing pointer information indicating a connection to a next block, and an address storing field for storing an address corresponding to the address field of the corresponding block of said first memory means;
    step designation means for producing a signal representing a step whose memory location is to be detected;
    counter means for counting the number of steps stored in said step information field;
    status detection means connected to receive output signals of said step designation means and said counter means for detecting a specific status therebetween, the counting by said counter means being carried out initially with respect to the unit chain corresponding to a predetermined start block and if said specific status is not detected after counting the number of steps in said start block, then the counting being carried out with respect to the unit chain corresponding to the next block successively indicated by the pointer information until said status detection means detects said specific status; and
    read means responsive to the detection of said specific status by said status detection means for reading information from that block of said first memory means having the address storing field corresponding to the address read from the address storing field of the unit chain with respect to which the counting by said counter means is carried out upon detection of said specific status by said status detection means.

6. A memory system comprising:
    first memory means having a plurality of blocks and address fields one for each of said blocks;
    second memory means having a faster access time than said first memory means and having unit chains one for each of said blocks, each of said unit chains having a step information field for storing step information representing the number of steps stored in the corresponding block, a pointer information field for storing pointer information indicating a connection to a next block, and an address storing field for storing an address corresponding to the address field of the corresponding block of said first memory means;

step designation means for producing a signal representing a step whose memory location is to be detected;
counter means for counting the number of steps stored in said step information field;
status detection means connected to receive output signals of said step designation means and said counter means for detecting a specific status therebetween, the counting by said counter means being carried out initially with respect to the unit chain corresponding to a predetermined start block and if said specific status is not detected after counting the number of steps in said start block, then the counting being carried out with respect to the unit chain corresponding to the next block successively indicated by the pointer information until said status detection means detects said specific status; and
updating means responsive to the detection of said specific status by said status detection means for updating the pointer information stored in the unit chain with respect to which the counting by said counter means is carried out upon detection of said specific status by said status detection means.

7. A memory system comprising:
first memory means having a plurality of blocks and address fields one for each of said blocks;
second memory means having a faster access time than said first memory means having unit chains one for each of said blocks, each of said unit chains having a pointer information field for storing pointer information indicating a connection to a next block, and an address storing field for storing an address corresponding to the address field of the corresponding block of said first memory means;
block designation means for producing a signal representing a block whose memory location is to be detected;
counter means for counting the number of blocks; and
status detection means for receiving output signals of said block designation means and said counter means to detect a specific status therebetween, the counting by said counter means being made initially with respect to the unit chain corresponding to a predetermined start block and made thereafter with respect to the unit chain corresponding to the next block successively indicated by the pointer information until said status detection means detects said specific status, the detection of said specific status by said status detection means indicating that said block to be detected is that a block of said first memory means corresponding to the unit chain with respect to which the counting by said counter means is made upon detection of said specific status by said status detection means.

8. A method for access in a memory system including first memory means having a plurality of blocks and second memory means having a faster access time than said first memory means and having a plurality of unit chains which correspond to said blocks respectively and in each of which step information representative of the number of steps stored in the corresponding block and pointer information indicative of a connection to a next block are stored, said method comprising:
producting a signal representing a step number to be read;
reading the step information stored in the unit chain of said second memory means;
counting the number of steps on the basis of said step information initially with respect with the unit chain corresponding to a predetermined start block and thereafter with respect to the unit chain corresponding to the next block successively indicated by the pointer information;
comparing an output signal produced in said counting step with said step number signal to produce a signal when a specific status therebetween is detected; and
reading information stored in that block of said first memory means corresponding to the unit chain of said second memory means with respect to which the counting is carried out when said specific status is detected in said comparing step.

* * * * *